(12) United States Patent
Armitage

(10) Patent No.: US 8,854,371 B2
(45) Date of Patent: Oct. 7, 2014

(54) METHOD AND SYSTEM FOR GENERATING A COLUMNAR TREE MAP

(75) Inventor: John Armitage, Berkeley, CA (US)

(73) Assignee: SAP AG, Walldorf (DE)

( * ) Notice: Subject to any disclaimer, the term of this patent is extended or adjusted under 35 U.S.C. 154(b) by 343 days.

(21) Appl. No.: 13/222,372

(22) Filed: Aug. 31, 2011

(65) Prior Publication Data

US 2013/0050217 A1 Feb. 28, 2013

(51) Int. Cl.
*G06T 11/20* (2006.01)

(52) U.S. Cl.
CPC .................................. *G06T 11/206* (2013.01)
USPC .......................................................... 345/440

(58) Field of Classification Search
USPC .......................................................... 345/440
See application file for complete search history.

(56) References Cited

U.S. PATENT DOCUMENTS

| | | | |
|---|---|---|---|
| 6,583,794 B1 * | 6/2003 | Wattenberg | 715/708 |
| 7,027,052 B1 * | 4/2006 | Thorn et al. | 345/440 |
| 7,346,858 B1 * | 3/2008 | Berg et al. | 715/853 |
| 7,429,987 B2 * | 9/2008 | Leah et al. | 345/440 |
| 7,509,591 B1 * | 3/2009 | Thorn et al. | 715/853 |
| 7,911,465 B2 * | 3/2011 | Rhodes et al. | 345/440 |
| 2004/0263513 A1 * | 12/2004 | Smith et al. | 345/440 |
| 2009/0013271 A1 * | 1/2009 | Helfman et al. | 715/764 |
| 2009/0013281 A1 * | 1/2009 | Helfman et al. | 715/788 |
| 2009/0013287 A1 * | 1/2009 | Helfman et al. | 715/853 |
| 2009/0089421 A1 * | 4/2009 | Boehm et al. | 709/224 |
| 2010/0042644 A1 * | 2/2010 | Judy et al. | 707/102 |
| 2011/0134143 A1 * | 6/2011 | Ko et al. | 345/659 |
| 2011/0252327 A1 * | 10/2011 | Awasthi et al. | 715/736 |

OTHER PUBLICATIONS

De Berg, Mark, et al., "Convex Treemaps with Bounded Aspect Ratio", EuroCG, (Mar. 2011), 71-74.
Wattenberg, Marlin, et al., "A Note on Space-Filling Visualizations and Space-Filling Curves", INFOVIS, Proceedings of the 2005 IEEE Symposium on Information Visualization, (2005), 6 pgs.

* cited by examiner

*Primary Examiner* — M Good Johnson
(74) *Attorney, Agent, or Firm* — Schwegman Lundberg & Woessner, P.A.

(57) ABSTRACT

A method and system to generate a columnar tree map of a hierarchical structure is provided. An example system comprises a memory, at least one processor coupled to the memory, a data access module configured to access a hierarchical data structure, and a tree map generator to generate a tree map using at least one processor. The tree map generator generates and renders a tree map for a target data set based on the size and dimensions of a viewing area provided on a target display device, the values associated with categories in the data set, and a predetermined column width.

18 Claims, 9 Drawing Sheets

METHOD AND SYSTEM FOR GENERATING A COLUMNAR TREE MAP

TECHNICAL FIELD

This application relates to the technical fields of software and/or hardware technology and, in one example embodiment, to system and method for generating a columnar tree map.

BACKGROUND

Some common ways of visualizing a data set having items associated with respective values are stacked bar graphs and pie charts where data is represented in a way that illustrates percentage breakdown of a whole into its parts. Another visualization technique involves creating a tree map according to a specific spatial algorithm. A tree map may be used to display tree-structured data as a set of nested rectangles, where each branch of the tree is represented by a rectangle. The rectangles representing respective tree branches may be tiled with smaller rectangles representing sub-branches. Tree maps enable users to see patterns of data, but the spaces used to render respective spatial contribution of the data elements are often awkwardly shaped and sized and may not always be well suitable for the display of any relevant associated content.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
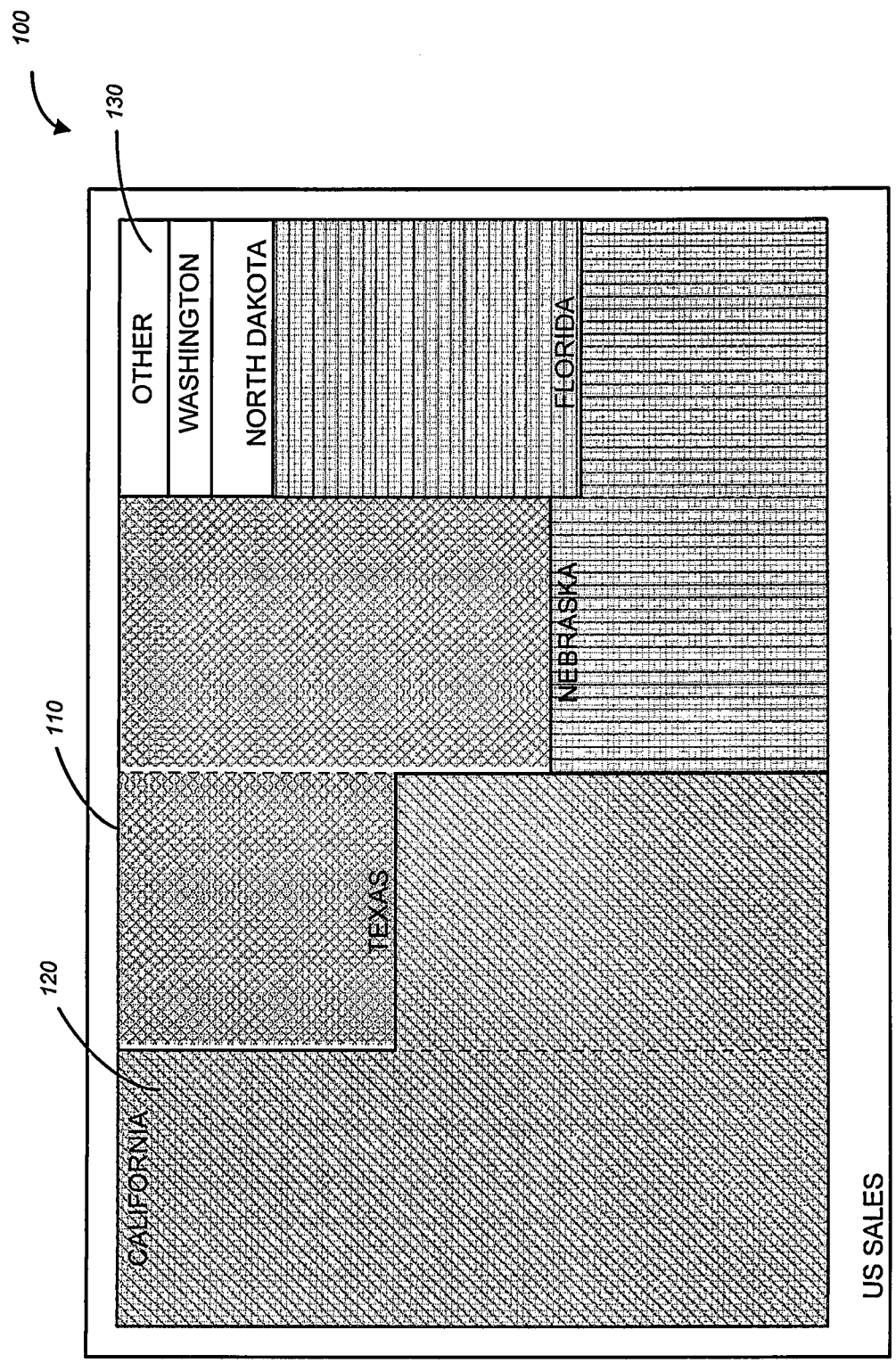
FIG. 1 is a graphical user interface illustrating an example columnar tree map, in accordance with one example embodiment.

A method and system for generating a columnar tree map is described. In the following description, for purposes of explanation, numerous specific details are set forth in order to provide a thorough understanding of an embodiment of the present invention. It will be evident, however, to one skilled in the art that the present invention may be practiced without these specific details.

Business software users need an efficient and responsive way to search and explore quantitatively-structured data in order to support decision-making. Visualization of hierarchical structures aids users in understanding how large sets of business data are broken into categories. In one example embodiment, a system is provided for generating a tree map for a hierarchically organized data set, where the tree map represents categories in the data set as segments. A display area, within which the tree map is to be rendered, is associated with a grid comprising a plurality of columns, each column having the same column width. Each segment in the tree map represents a quantitative contribution of the associated category to the numerical aspect associated with all categories in that level of the hierarchy. For example, where a data set represents nation-wide sales data broken down per state, the system may use the amount of sales contribution from each state to the value representing the sales for all 50 states (e.g., the sales for California may be 22% of the entire amount, Texas may be 19%, etc.). The system, upon a request to generate a tree map for the data set, assigns a spatial mapping of the percentages along a one-dimensional continuum, and then flows this one-dimensional mapping along the columns of pre-determined width that divide the display area. Thus generated tree map may be termed a columnar tree map.

Columnar tree maps thus provide a unique proportional visualization of how a quantity of data is divided into categories based upon percentage contribution of each category to the whole amount contributed by all categories by drawing a proportionally-sized tree map to occupy a certain viewing area. If a category in the subject data set comprises sub-categories associated with their respective values, the segment in the tree map representing that category can be divided, by size contribution of the sub categories, into sub-segments. These sub-categories may thus be represented within the segment area dedicated to the parent category according to the amount of space devoted to each sub-segment in the visualization. An example feature of a columnar tree map is that while it divides a quantitative whole into percentage breakdowns of contributing categories and displays sorted spatial representations of this breakdown, it does so such that each segment area is drawn according to pre-determined column width that may be chosen in a way to permit even the smaller segments to have sufficient width to contain a typographic title or any other typographical or graphical content within its borders. In one embodiment, a system for generating a columnar tree map may also be configured to automatically group representations of categories having respective values less than a predetermined threshold into a so-called combination segment that may be labeled as "OTHER" category. Categories associated with smaller values can be displayed within this combination segment without displaying their respective labels.

Figure 2:
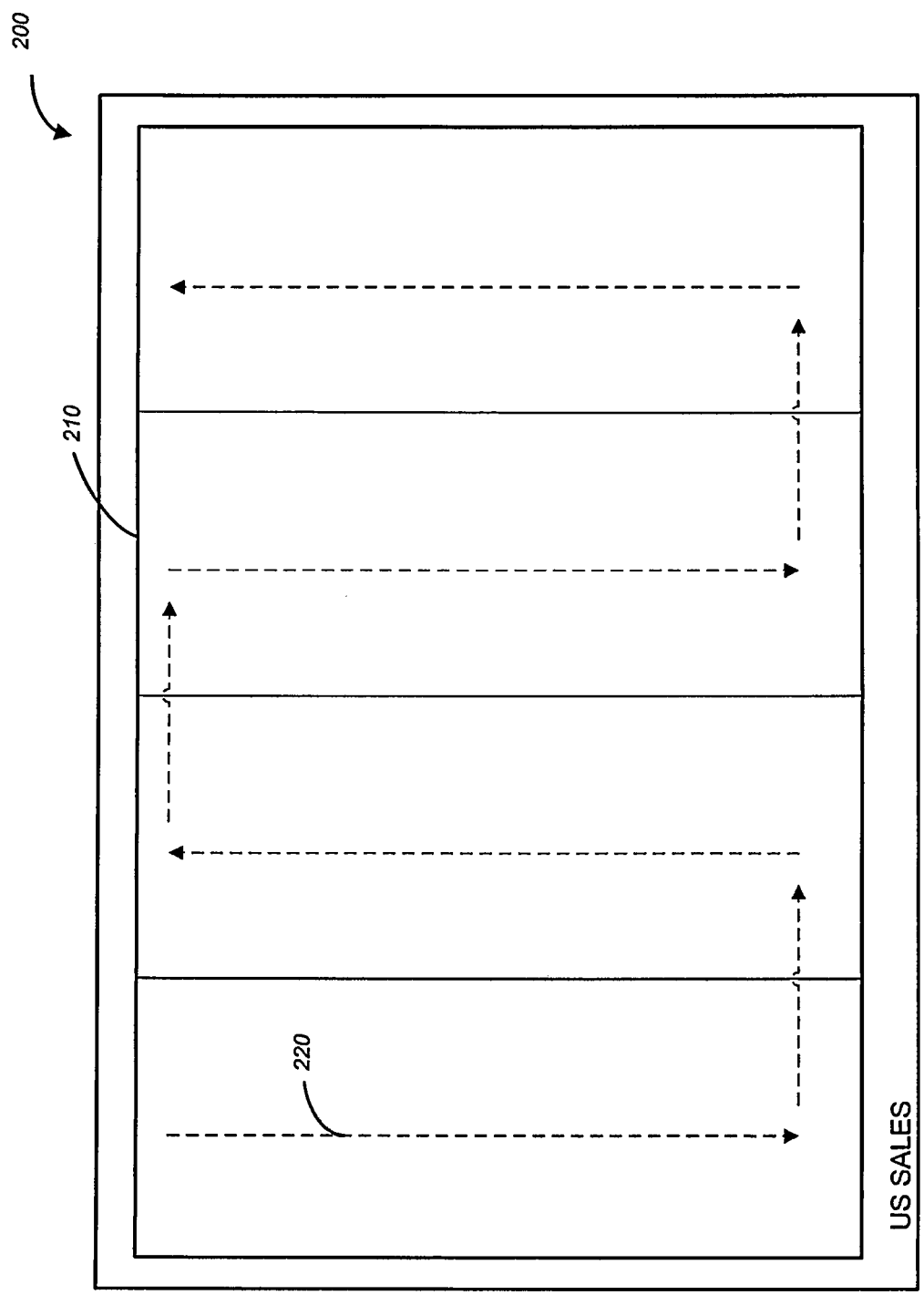
FIG. 2 shows a grid underlying a viewing area, within which an example columnar tree map can be rendered, in accordance with one example embodiment.

An example columnar tree map is shown in FIG. 1. The columnar tree map is presented in a view 100 and represents a data set comprising values for nation-wide sales data broken down per state. A tree map 110 comprises segments 120 representing sales values for different states. A combination segment 130, labeled "OTHER," represents states, for which respective sales values are below a predetermined minimum value. As mentioned above, the display of segments in a columnar tree map is driven by a grid underlying the display area within which the tree map is to be rendered. A graphical representation of a grid comprising a plurality of columns having a predetermined column width is shown in FIG. 2. The flowing of a one-dimensional mapping along the predetermined columns of the grid 210 (where the mapping is created based on data from a certain hierarchical level in a data set) is illustrated by arrows 220.

Figure 3:
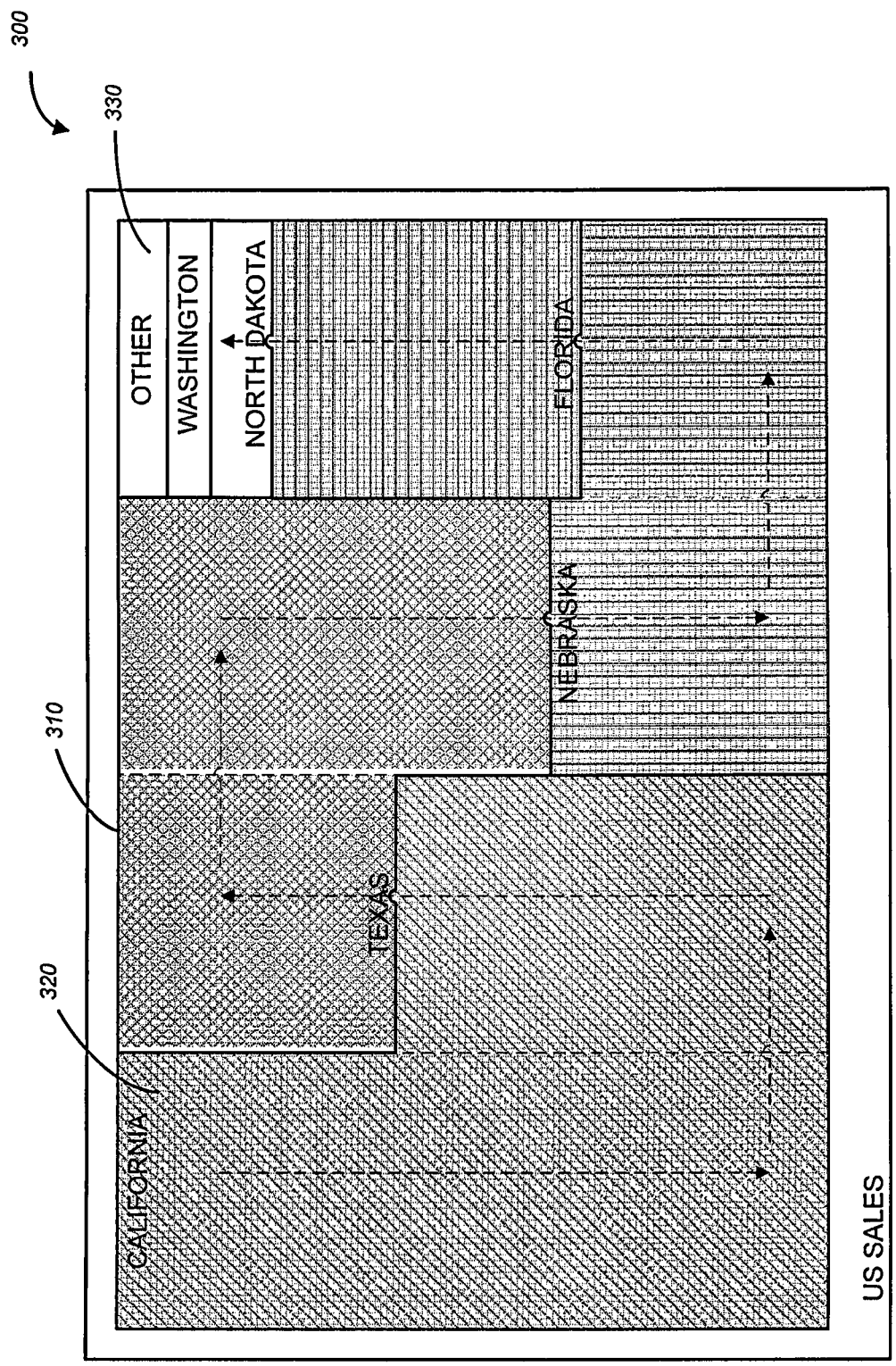
FIG. 3 is a user interface illustrating an example columnar tree map and the direction of flowing of data mapped along a one-dimensional continuum along pre-determined columns of the grid associated with the viewing area, in accordance with one example embodiment.
Figure 4:
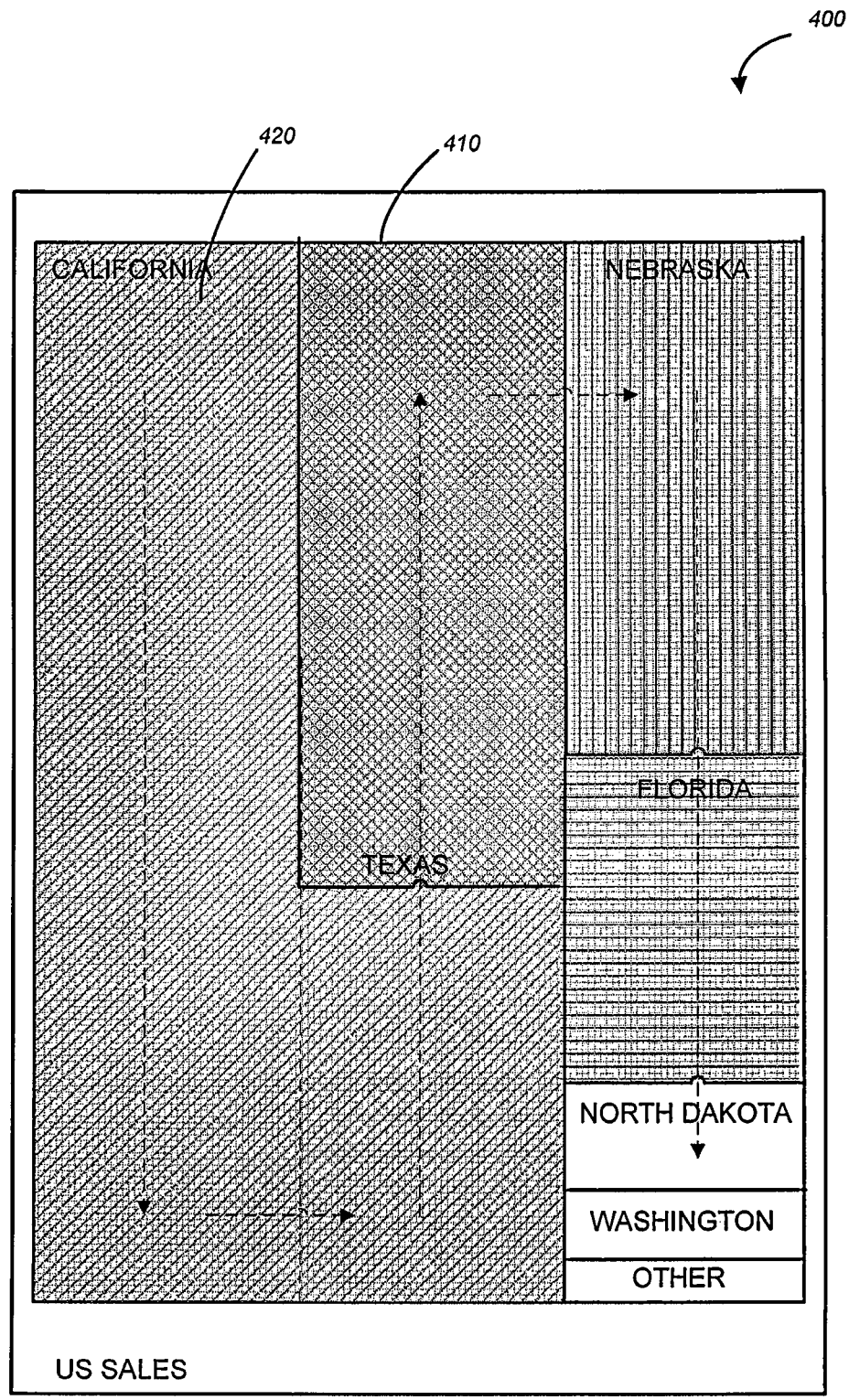
FIG. 4 is a graphical user interface illustrating an example columnar tree map presented on a display device in a portrait mode, in accordance with one example embodiment.

FIG. 3 is a representation 300 of a columnar tree map generated for a data set of nation-wide sales data broken down per state by flowing one-dimensional mapping of percentage contributions of values associated with respective states along the predetermined columns of the grid associated with the viewing area 310, where the flowing is illustrated by arrows 320. FIG. 4 shows a view 400 of a columnar tree map that corresponds to one shown in FIG. 3 but is presented on a mobile device in a portrait display mode. As shown in FIG. 4, the number of columns has been adapted to the width of the display device, which influences the positioning of segments 410.

Figure 5:
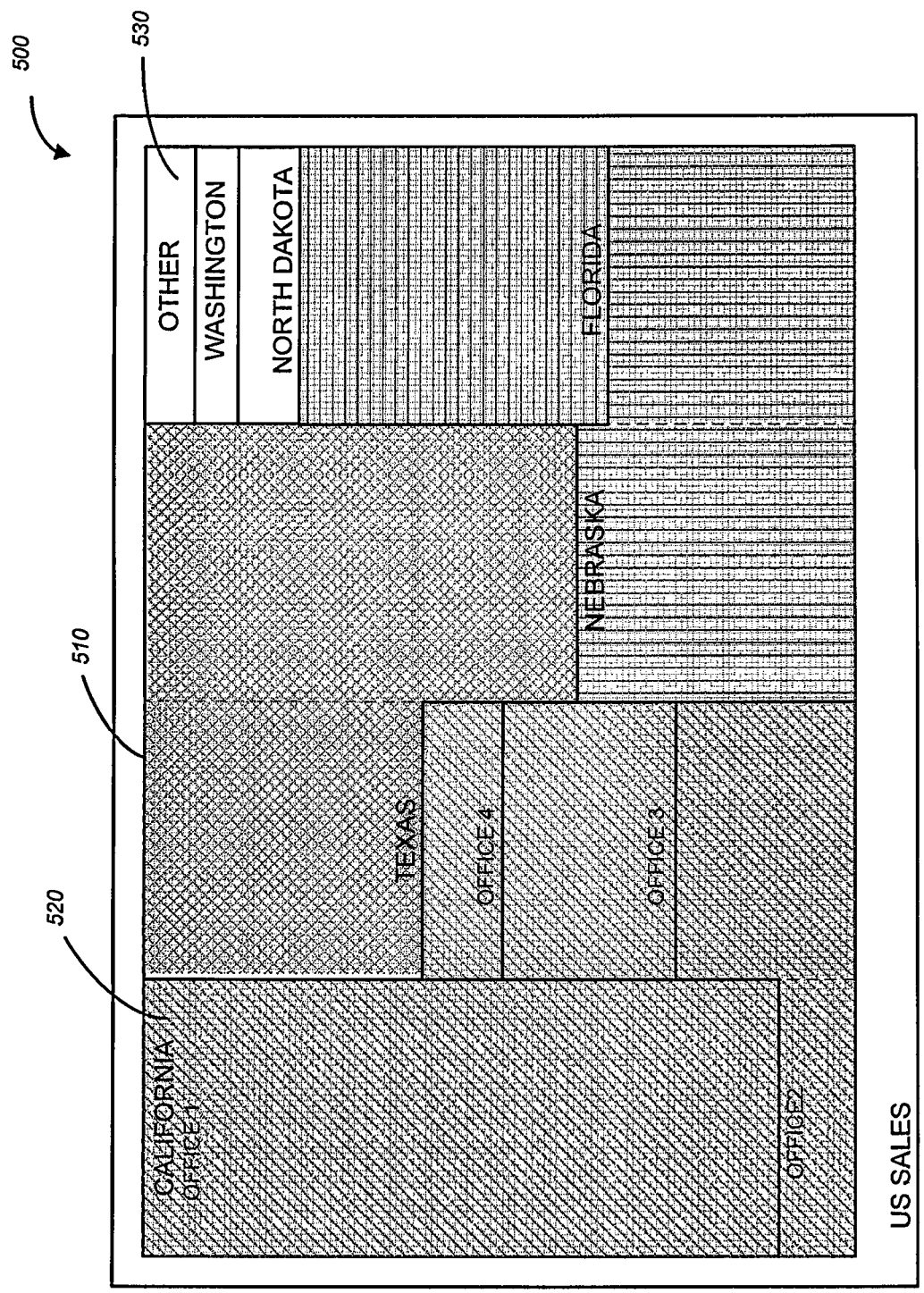
FIG. 5 is a graphical user interface illustrating an example columnar tree map comprising representations of categories and sub-categories of a hierarchical data structure, in accordance with one example embodiment.

As mentioned above, if an element (e.g., a category) from the subject data set itself comprises sub-categories, the sub-categories may be represented within the segment area dedicated to the parent category. An example view 500 with a columnar tree map representing categories and sub-categories of a data set is shown in FIG. 5. As shown in FIG. 5, a segment 510 representing category "CALIFORNIA" is divided into segments 520 that represent respective sub-categories of the "CALIFORNIA" category. Here the sub-categories of the "CALIFORNIA" category are associated with respective sales offices located in the state of California. An example method and system for generating a columnar tree map may be implemented in the context of a network environment 600 illustrated in FIG. 6.

Figure 6:
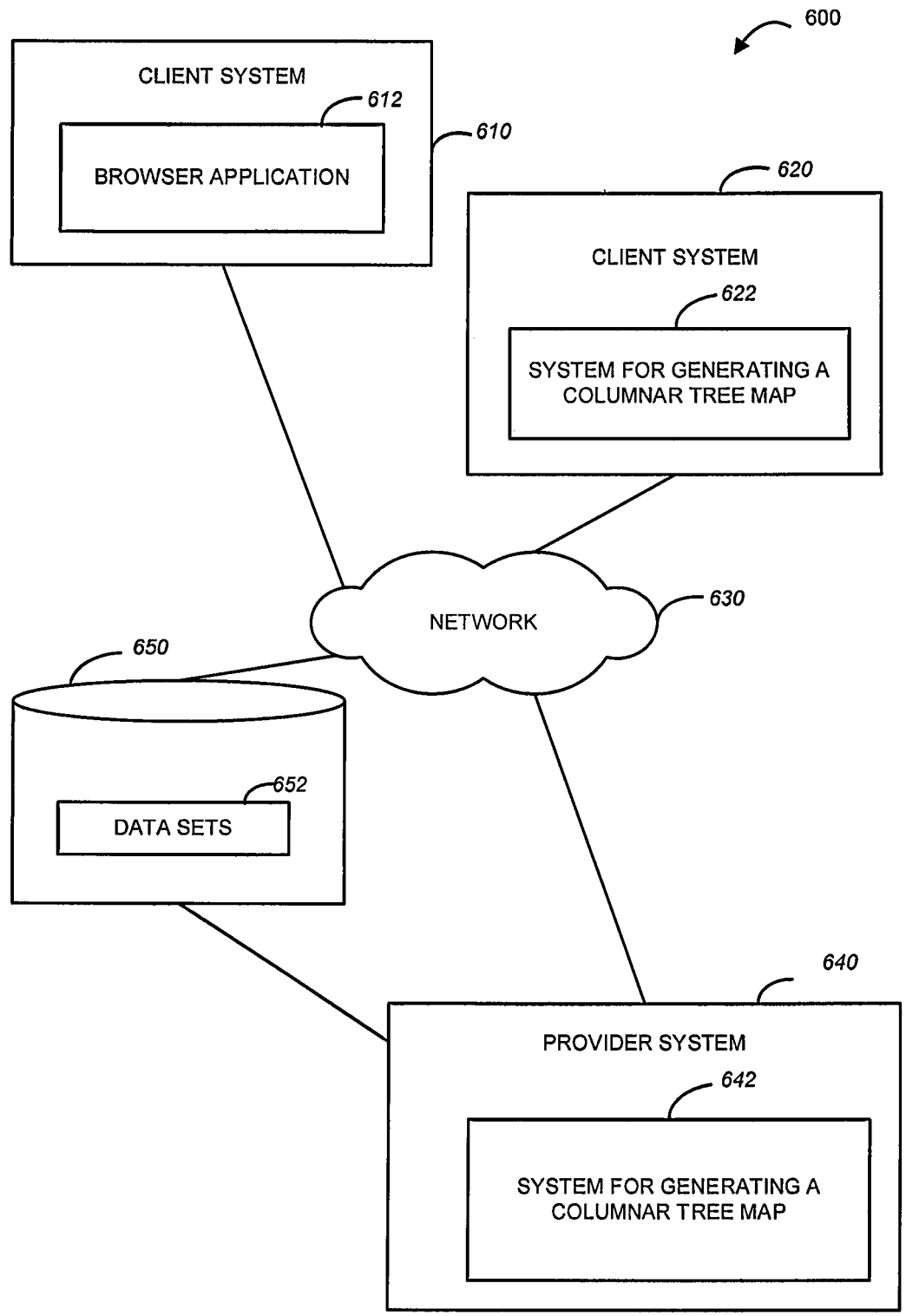
FIG. 6 is a diagrammatic representation of a network environment within which an example method and system for generating a columnar tree map may be implemented.

As shown in FIG. 6, the network environment 600 may include client systems 610 and 620 and a server system 640. The server system 640, in one example embodiment, may host a system 642 for generating a columnar tree map. The client system 610 and 620 may host a browser application 612 and may have access to the server system 640 via a communications network 630. The communications network 630 may be a public network (e.g., the Internet, a wireless network, etc.) or a private network (e.g., a local area network (LAN), a wide area network (WAN), Intranet, etc.).

The client system 610 may utilize the browser application 612 to access services provided by the server system 640. For example, the server 640 may host a system 642 for generating a columnar tree map. A system for generating a columnar tree map, in one embodiment, bay be executing at a client computer system, such as, e.g., a system for generating a columnar tree map 622 executing at the client system 620. As shown in FIG. 6, a system for generating a columnar tree map may be configured to access hierarchical data sets that are stored at a client or a server computer system (not shown) or at a remotely-located repository. An example remote repository 650 is shown in FIG. 6 as storing data sets 652. An example system for generating a columnar tree map may be described with reference to FIG. 7.

Figure 7:
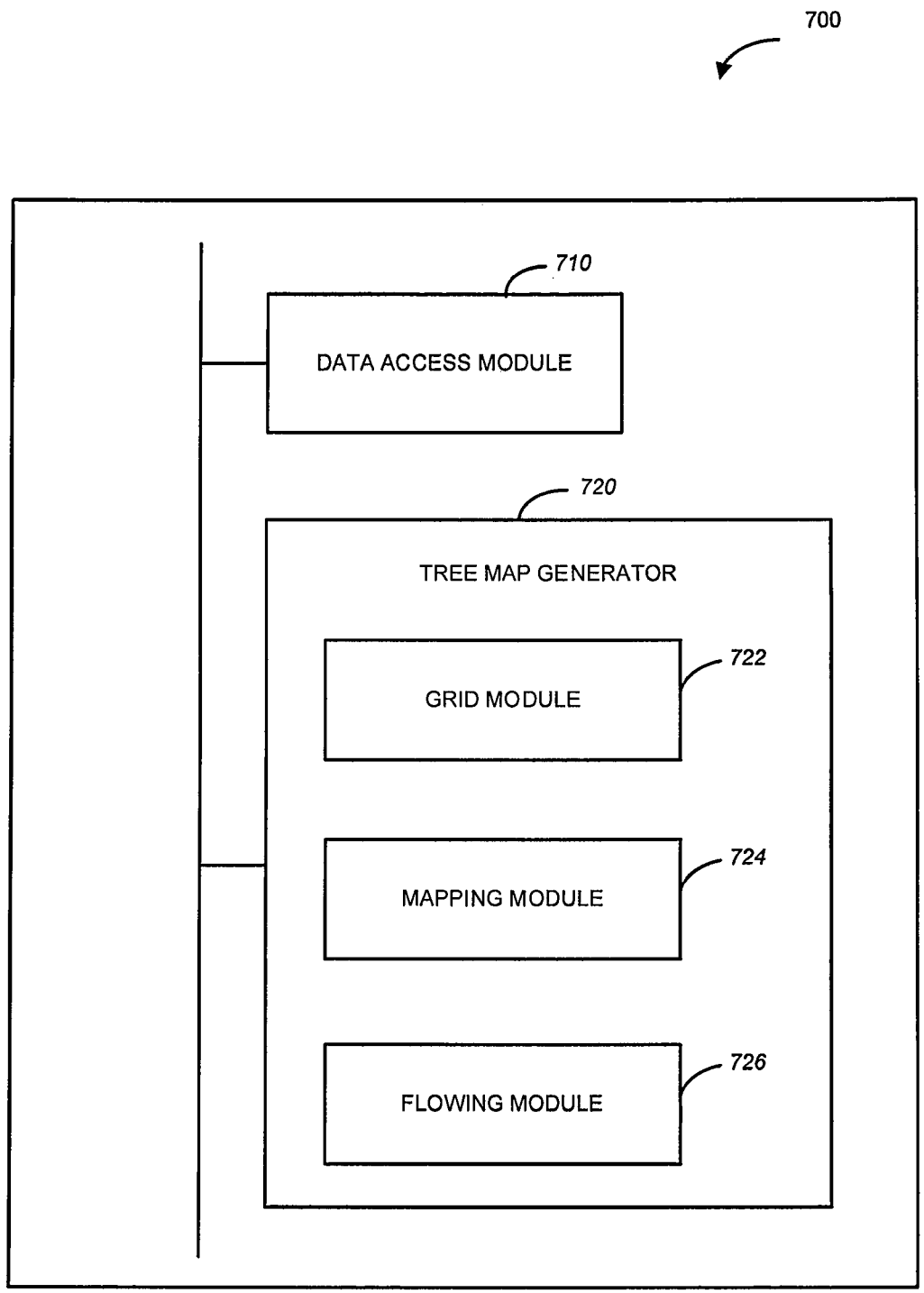
FIG. 7 is block diagram of a system for generating a columnar tree map, in accordance with one example embodiment.

FIG. 7 is a block diagram of a system 700 to generate a columnar tree map. The system 700 may be implemented in software, hardware, or a combination thereof. In one embodiment, the system 700 comprises a memory, at least one processor coupled to the memory, a data access module 710 configured to access a hierarchical data structure, and a tree map generator 720 to generate a tree map using at least one processor. As mentioned above, the system 200 to generate a columnar tree map may reside at a server computer system and may be accessed, as a service, from a client computer system via a web browser application. In some embodiments, the system 200 may reside at a client computer system and accessed directly without the use of a web browser application. The tree map generator 720 may be configured to generate and render a tree map for a target data set based on the size and dimensions of a viewing area provided on a target display device, the values associated with categories in the data set, and a predetermined column width. The values associated with categories in the data set are treated as representing respective quantitative contributions of categories (e.g., sales for different states, as described in the example above) to a numerical aspect associated a whole (in the example above, the numerical aspect is the total amount of sales nation-wide calculated as the sum of sales values for all states).

As shown in FIG. 7, the tree map generator 720 comprises a grid module 722, a mapping module 724, and a flowing module. The grid module 722 may be configured to associate the viewing area with a grid that comprise a plurality of columns of the specified column width. In some embodiments, the grid module 722 may determine a mode of a display device on which the tree map is to be rendered (e.g., a landscape mode as shown in FIG. 1 or a portrait mode as shown in FIG. 4.) and create/select the grid based on the determined mode of the display device. When the tree map generator 720 renders the generated tree map in a viewing area, the grid underlying the viewing area is being obscured. The mapping module 724 may be configured to assign a spatial mapping of the respective quantitative contributions, sequentially, along a one-dimensional continuum. The flowing module 722 may be configured to flow the one-dimensional mapping along the plurality of columns in the viewing area.

Example tree maps that may be generated by the tree map generator 720 are shown in FIG. 1-5. As can be seen, e.g., in FIG. 1 that was described above, the tree map generator may render a visually identifiable border for each segment in the plurality of segments of the generated tree map, as well as respective labels for the segments. The tree map generator 720 may also be configured to render a representation of categories associated with respective values that are less than a predetermined threshold as a single segment termed a combination segment. An example of a combination segment labeled as "Other" is shown in FIG. 1. The threshold may be selected based on, e.g., a text size used for labels identifying segments in the tree map. When a subject data set comprises hierarchically structured data having more than one hierarchy level (e.g., where a category in the data set is a parent category in that it itself comprises a set of categories or sub-categories) the tree map generator 720 may render segments representing these sub-categories within an area of the segment that represents the parent category. For this task, the tree map generator 720 utilizes the area of the segment that represents the parent category, the specified column width, and respective quantitative contributions of sub-categories a numerical aspect associated with the parent category. An example method to for generating a columnar tree map can be described with reference to FIG. 8.

Figure 8:
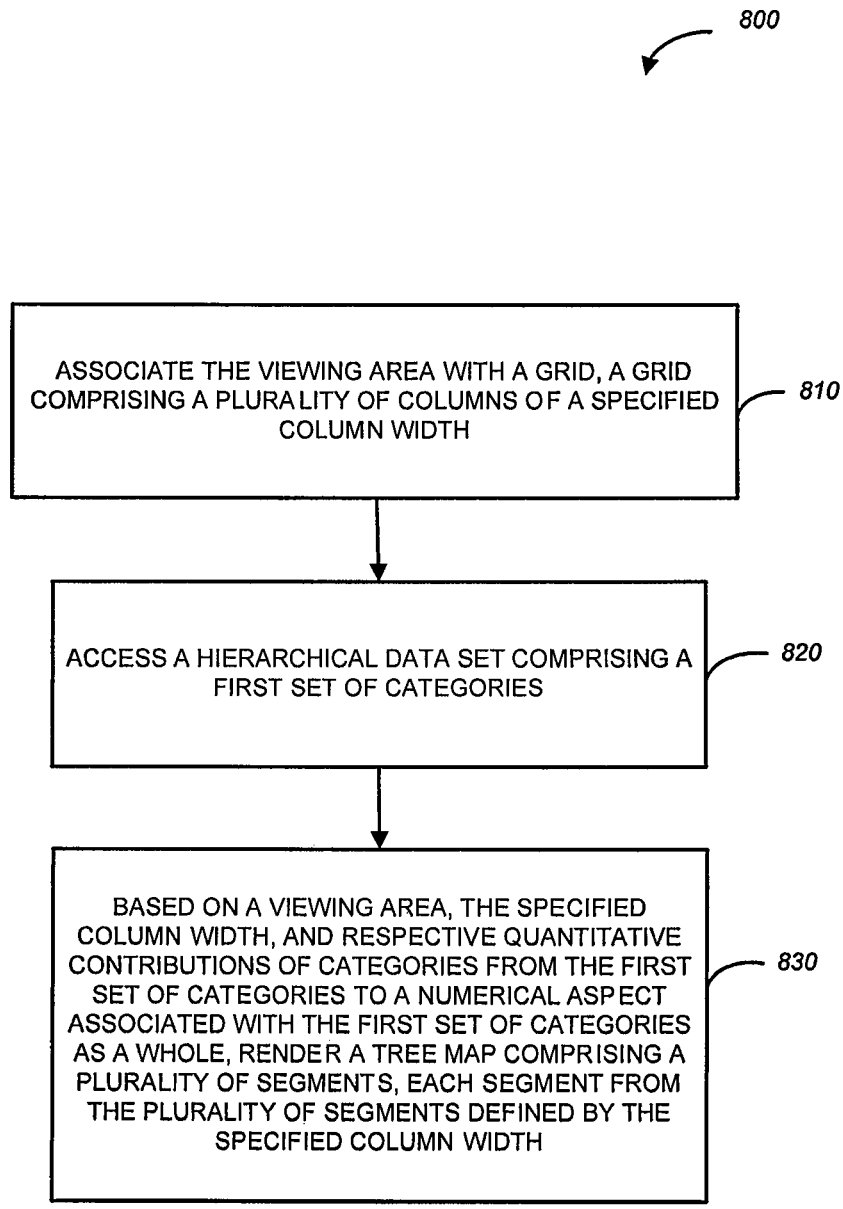
FIG. 8 is a flow chart of a method for generating a columnar tree map, in accordance with an example embodiment.

FIG. 8 is a flow chart of a method 800 for generating a columnar tree map, according to one example embodiment. The method 800 may be performed by processing logic that may comprise hardware (e.g., dedicated logic, programmable logic, microcode, etc.), software (such as run on a general purpose computer system or a dedicated machine), or a combination of both. In some embodiments, the processing logic resides at the server system 640 or the client system 620 of FIG. 6 and includes modules shown in FIG. 7.

As shown in FIG. 8, the method 800 commences at operation 810, when the grid module 722 of FIG. 7 associates the target viewing area, within which a columnar tree map is to be rendered, with a grid that comprises a plurality of columns of the specified column width. The column width may be selected such that any descriptive information may be easily displayed within respective areas of the segments that constitute the tree map. The data access module 710 of FIG. 7 accesses a hierarchical data structure comprising a set of categories at operation 820. The tree map generator 720 of FIG. 7 renders a tree map representing the data structure at operation 830. The resulting tree map is generated based on the dimensions of the viewing area, the width of the columns in the grid that underlies the viewing area, and respective values associated with categories in the data structure.

Figure 9:
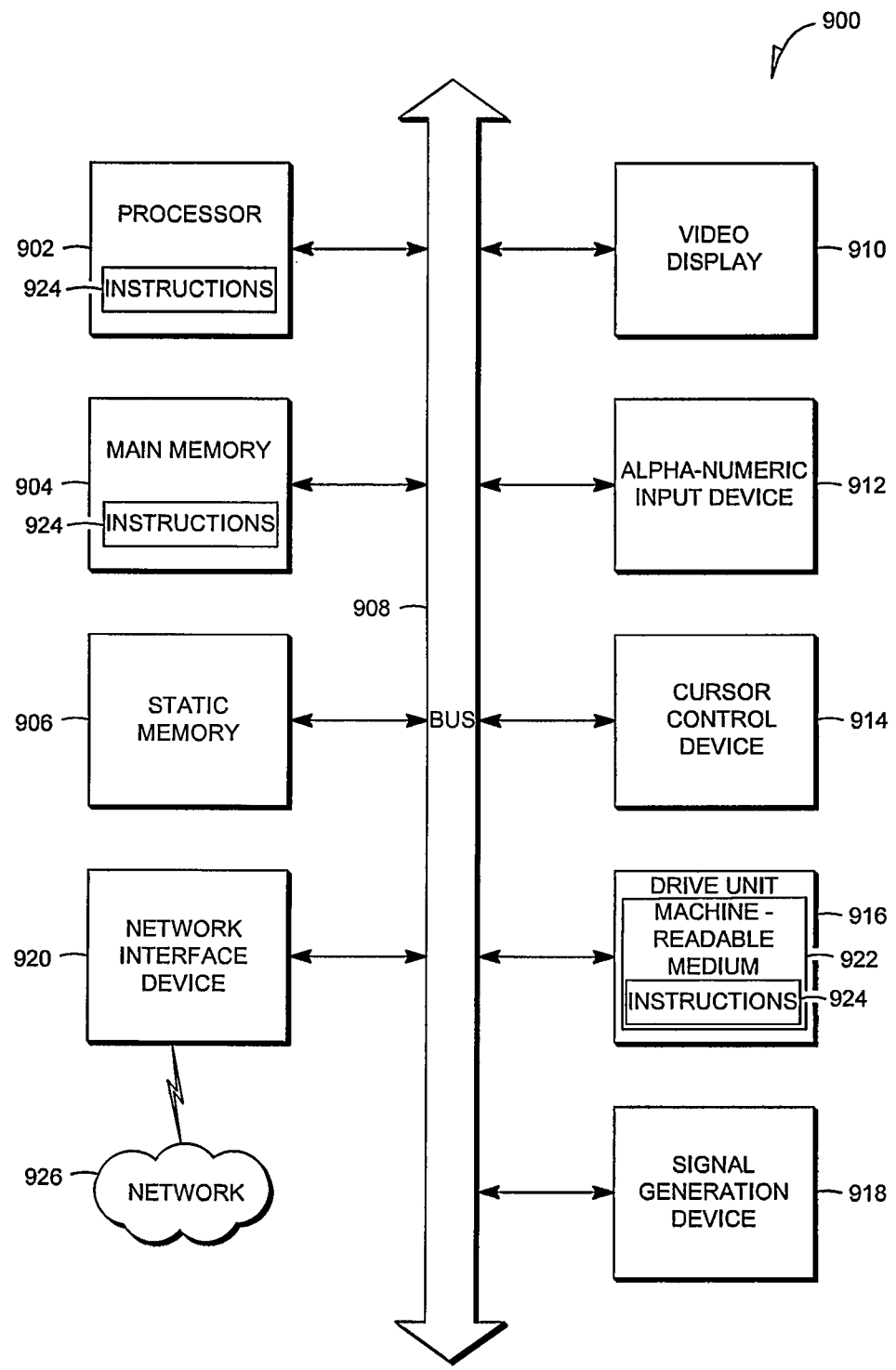
FIG. 9 is a diagrammatic representation of an example machine in the form of a computer system within which a set of instructions, for causing the machine to perform any one or more of the methodologies discussed herein, may be executed.

FIG. 9 shows a diagrammatic representation of a machine in the example form of a computer system 900 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 909. The computer system 900 may further include a video display unit 910 (e.g., a liquid crystal display (LCD) or a cathode ray tube (CRT)). The computer system 900 also includes an alpha-numeric input device 912 (e.g., a keyboard), a user interface (UI) navigation device 914 (e.g., a cursor control device), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer system 900, with the main memory 904 and the processor 902 also constituting machine-readable media.

The software 924 may further be transmitted or received over a network 926 via the network interface device 920 utilizing any one of a number of well-known transfer protocols (e.g., Hyper Text Transfer Protocol (HTTP)).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system to generate a columnar tree map representing a hierarchical data structure has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
    accessing a hierarchical data structure comprising a first set of categories;
    associating a viewing area with a grid, the grid comprising a plurality of columns, each column from the plurality of columns having the same specified column width;
    determining respective quantitative contributions of categories from the first set of categories to a numerical aspect associated with the first set of categories as a whole;
    assigning a spatial mapping of the respective quantitative contributions of the categories from the first set of categories along a one-dimensional continuum;
    flowing the spatial mapping along the plurality of columns in the viewing area to generate a tree map, the tree map comprising a plurality of segments, a segment from the plurality of segments corresponding to a category from the plurality of categories; and
    rendering, using at least one processor coupled to a memory, the tree map.

2. The method of claim 1, comprising:
    determining a mode of a display device on which the tree map is to be rendered, the mode comprising a portrait mode or a landscape mode; and
    selecting the grid based on the determined mode of the display device.

3. The method of claim 1, comprising obscuring the grid associated with the viewing area.

4. The method of claim 1, comprising providing a visually identifiable border for each segment in the plurality of segments.

5. The method of claim 1, comprising rendering respective labels for segments in the plurality of segments.

6. The method of claim 1, comprising:
   determining that a certain category from the plurality of categories is associated with a value that is less than a predetermined threshold; and
   rendering a representation of the certain category in the tree map as a combination segment from the plurality of segments, the combination segment being associated with two or more categories from the set of categories.

7. The method of claim 5, wherein the predetermined threshold is associated with a text size used for labels identifying segments in the tree map.

8. The method of claim 1, comprising presenting respective segments from the set of segment using respective color values.

9. The method of claim 1, wherein a certain category from the first set of categories comprises a second set of categories, the certain category represented by a certain segment from the first set of segments;
   based on an area of the certain segment, the specified column width, and respective quantitative contributions of categories from the second set of categories to a numerical aspect associated with the certain category, render segments representing respective categories from the second set of categories within an area of the certain segment.

10. A system comprising:
   a data access module, implemented using at least one processor, to access a hierarchical data structure comprising a first set of categories; and
   a grid module, implemented using at least one processor, to associate the viewing area with a grid, the grid comprising a plurality of columns, each column from the plurality of columns having the same specified column width;
   a module, implemented using at least one processor, to determine respective quantitative contributions of categories from the first set of categories to a numerical aspect associated with the first set of categories as a whole;
   a mapping module, implemented using at least one processor, to assign a spatial mapping of the respective quantitative contributions, sequentially, along a one-dimensional continuum;
   a flowing module, implemented using at least one processor, to flow the one-dimensional mapping along the plurality of columns in the viewing area to generate a tree map, the tree map comprising a plurality of segments, a segment from the plurality of segments corresponding to a category from the plurality of categories; and
   a tree map generator to render, using the at least one processor, the tree map.

11. The system of claim 1, wherein the grid module is to:
   determine a mode of a display device on which the tree map is to be rendered, the mode comprising a portrait mode or a landscape mode; and
   select the grid based on the determined mode of the display device.

12. The system of claim 10, wherein the treemap generator is to render the tree map while obscuring the grid associated with the viewing area.

13. The system of claim 10, wherein the tree map generator is to render a visually identifiable border for each segment in the plurality of segments.

14. The system of claim 10, wherein the tree map generator is to render respective labels for segments in the plurality of segments.

15. The system of claim 10, wherein the tree map generator is to determine that a certain category from the plurality of categories is associated with a value that is less than a predetermined threshold; and
   render a representation of the certain category in the tree map as a combination segment from the plurality of segments, the combination segment being associated with two or more categories from the set of categories.

16. The system of claim 14, wherein the predetermined threshold is associated with a text size used for labels identifying segments in the tree map.

17. The system of claim 10, wherein:
   a certain category from the first set of categories comprises a second set of categories, the certain category represented by a certain segment from the first set of segments; and
   the tree map generator is to render segments representing respective categories from the second set of categories within an area of the certain segment based on an area of the certain segment, the specified column width, and respective quantitative contributions of categories from the second set of categories to a numerical aspect associated with the certain category.

18. A machine-readable non-transitory medium having instruction data to cause a machine to:
   access a hierarchical data structure comprising a first set of categories;
   associate the viewing area with a grid, the grid comprising a plurality of columns, each column from the plurality of columns having the same specified column width;
   determine respective quantitative contributions of categories from the first set of categories to a numerical aspect associated with the first set of categories as a whole;
   assign a spatial mapping of the respective quantitative contributions, sequentially, along a one-dimensional continuum;
   flow the one-dimensional mapping along the plurality of columns in the viewing area to generate a tree map, the tree map comprising a plurality of segments, a segment from the plurality of segments corresponding to a category from the plurality of categories; and
   render the tree map.

* * * * *